(12) United States Patent
    Anderson et al.

(10) Patent No.: US 9,264,554 B2
(45) Date of Patent: Feb. 16, 2016

(54) PROVIDING NETWORK ACCESS

(71) Applicant: International Business Machines Corporation, Armonk, NY (US)

(72) Inventors: Jason L. Anderson, San Jose, CA (US); Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/279,499

(22) Filed: May 16, 2014

(65) Prior Publication Data

US 2014/0248851 A1    Sep. 4, 2014

Related U.S. Application Data

(63) Continuation of application No. 13/670,593, filed on Nov. 7, 2012, now Pat. No. 8,849,244.

(51) Int. Cl.
| | | |
|---|---|---|
| *H04W 4/24* | (2009.01) | |
| *H04M 15/00* | (2006.01) | |
| *H04W 4/26* | (2009.01) | |
| *H04L 12/14* | (2006.01) | |

(52) U.S. Cl.
CPC ........... *H04M 15/09* (2013.01); *H04L 12/1475* (2013.01); *H04M 15/80* (2013.01); *H04W 4/24* (2013.01); *H04W 4/26* (2013.01); *H04L 12/1435* (2013.01); *H04M 15/60* (2013.01)

(58) Field of Classification Search
None
See application file for complete search history.

(56) References Cited

U.S. PATENT DOCUMENTS

| | | | |
|---|---|---|---|
| 7,336,927 | B2 | 2/2008 | Cervera et al. |
| 7,515,568 | B2 | 4/2009 | Bonta |
| 7,577,125 | B2 | 8/2009 | Abhishek et al. |
| 7,782,848 | B2 | 8/2010 | Kalavade et al. |
| 8,849,244 | B2 | 9/2014 | Anderson et al. |
| 2005/0128995 | A1 | 6/2005 | Ott et al. |
| 2008/0101400 | A1 | 5/2008 | Auterinen |
| 2008/0214162 | A1 | 9/2008 | Ramer et al. |
| 2008/0215428 | A1 | 9/2008 | Ramer et al. |

(Continued)

OTHER PUBLICATIONS

Chakravorty et al.; "MoB: A Mobile Bazaar for Wide-area Wireless Services"; Proceedings of the 11th Annual International Conference on Mobile Computing and Networking, MobiCom '05, 2005 [online], [retrived on Jul. 26, 2012]. Retrieved from the Internet <http://citeseerx.ist.psu.edu/viewdoc.download?doi=10.1.1.122.4572&rep=rep1&type=pdf>.

(Continued)

*Primary Examiner* — Diane Mizrahi
(74) *Attorney, Agent, or Firm* — William H. Hartwell; Jason H. Sosa

(57) ABSTRACT

A wireless service provider identifies a mobile computing device capable of short-range wireless communication and in an agreement to receive service from a cellular network. The wireless service provider provides, to the mobile computing device, terms for a third party computing device to accept in order to gain access to the cellular network via the mobile computing device. In response to a third party computing device agreeing to the terms, the wireless service provider indicates to the mobile computing device to allow the third party computing device to access the cellular network via the mobile computing device.

10 Claims, 5 Drawing Sheets

(56) References Cited

U.S. PATENT DOCUMENTS

| | | | |
|---|---|---|---|
| 2008/0215475 A1 | 9/2008 | Ramer et al. | |
| 2011/0149928 A1 | 6/2011 | Wu et al. | |
| 2011/0294502 A1 | 12/2011 | Oerton | |
| 2012/0190386 A1* | 7/2012 | Anderson | 455/456.3 |
| 2013/0053005 A1 | 2/2013 | Ramer | |
| 2014/0006129 A1* | 1/2014 | Heath | 705/14.23 |
| 2014/0128022 A1 | 5/2014 | Mizrahi | |
| 2015/0120502 A1* | 4/2015 | Jung et al. | 705/26.41 |

OTHER PUBLICATIONS

Defrawy et al.; "Incentive-Based Cooperative and Secure Inter-Personal Networking"; Proceedings of the 1st International MobiSys Workshop on Mobile Opportunistic Networking, MobiOpp '07, 2007 [online], [retrived on Jun. 11, 2012]. Retrieved from the Internet <http://citeseerx.ist.psu.edu/viewdoc/download?doi=10.1.1.116.2900&rep1&type=pdf>.

* cited by examiner

PROVIDING NETWORK ACCESS

FIELD OF THE INVENTION

The present invention relates generally to the field of providing network access, and more particularly, to a cellular network provider making network bandwidth available to computing devices through consumer devices of the cellular network provider's customers.

BACKGROUND OF THE INVENTION

A network service provider is a business organization that sells bandwidth or network access by providing direct backbone access to the Internet and usually access to its network access points. A wireless service provider (also referred to as a cellular company, mobile network operator, wireless carrier, or mobile network carrier) is a type of network service provider that owns or controls elements necessary to sell and deliver services to an end user including, in a non-exhaustive list, radio spectrum allocation, wireless network infrastructure, back haul infrastructure, and billing. Wireless service providers provide wireless communications services to end users, typically through a cellular network.

A cellular network is a radio network using varying radio frequencies over land areas called cells. Each cell is served by at least one fixed location transceiver (e.g., radio/cell tower). Radio waves are used to transfer signals between the fixed location transceiver and a cellular phone or device. The transceiver may pass signals along to other cellular capable devices within the cell, to another transceiver, or to a wired network connection. Many mobile computing devices, such as tablet computers and smartphones, are a capable of accessing a cellular network. Wireless service providers provide this access to registered mobile computing devices, typically under terms of a wireless contract. The cell tower typically acts as the network access point to the mobile computing device.

However, not all computing devices are capable of accessing a cellular network. For example, many laptops only support Wi-Fi wireless technology. Wi-Fi has a much shorter wireless range determined by wireless network access points (or hotspots), such as wireless routers, connected on the back end to an adjacent wired LAN. Mobile computing devices that are capable of connecting to a cellular network are often additionally capable of short range wireless communication, for example through Wi-Fi. Wi-Fi also allows communications directly from one computing device to another without an access point intermediary. This is called ad hoc Wi-Fi transmission. In this manner, a wireless computing device can share their cellular Internet connection using ad-hoc Wi-Fi transmission, becoming hotspots or "virtual routers."

SUMMARY

Embodiments of the present invention include a method, computer program product, and system for providing network access. A wireless service provider, via a computing device of the wireless service provider, identifies a mobile computing device capable of short-range wireless communication and in an agreement to receive service from a cellular network. The wireless service provider provides, to the mobile computing device, terms for a third party computing device to agree to in order to gain access to the cellular network via the mobile device, such that the mobile computing device can provide the terms to third party computing devices in wireless range of the mobile computing device. In response to receiving an indication from the mobile computing device that a third party computing device has agreed to the terms, the wireless service provider indicating to the mobile computing device to allow the third party computing device to access the cellular network via the mobile computing device.

DETAILED DESCRIPTION

Figure 1:
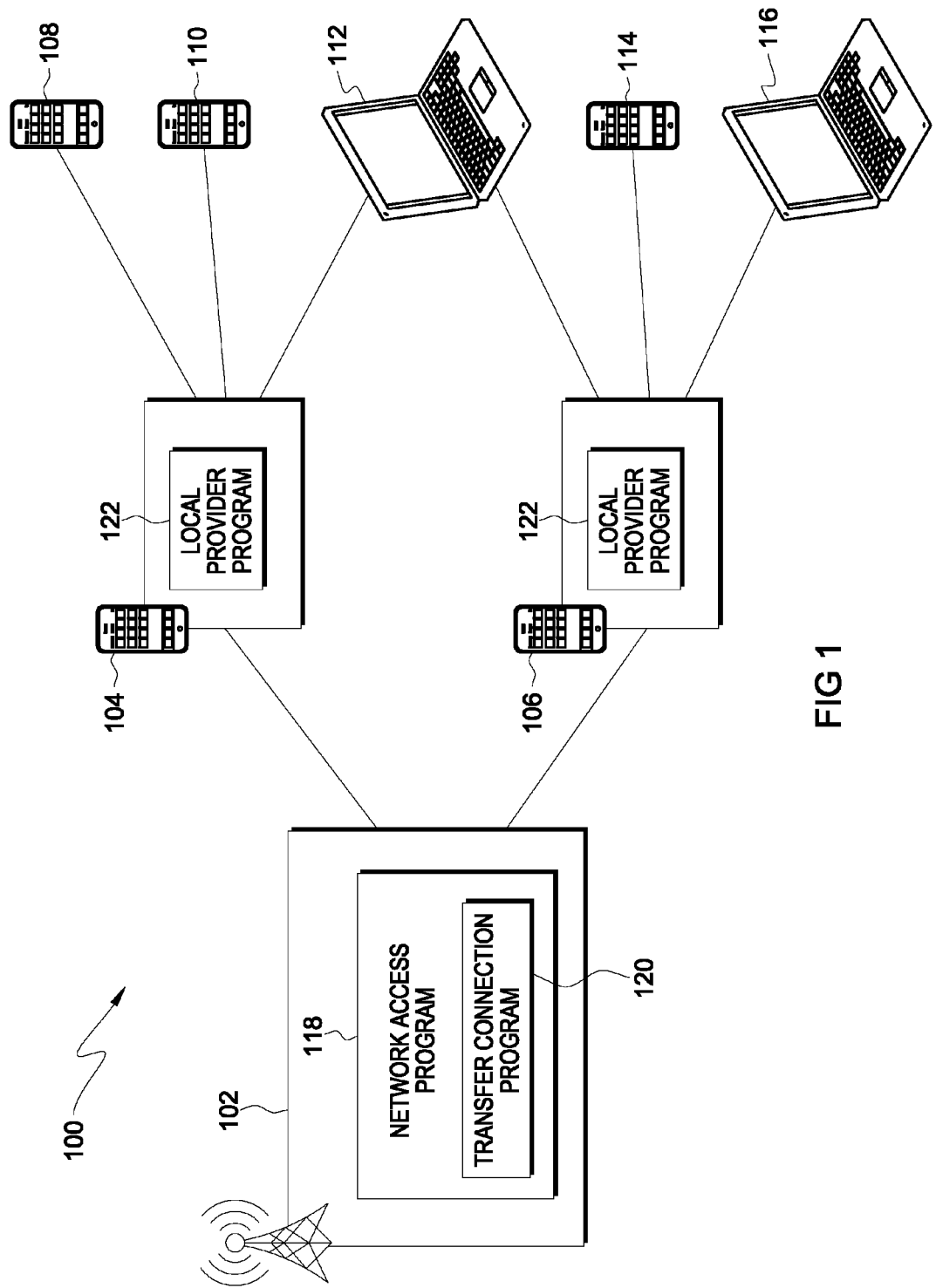
FIG. 1 is a functional block diagram illustrating a distributed data processing environment, in accordance with an embodiment of the present invention.

Embodiments of the present invention recognize that though coverage of cellular networks is broad, not all devices are equipped to take advantage of this coverage. Further, this coverage does not offer a viable alternative to pay network access points or a network access point that becomes overloaded. Towards these ends, embodiments of the present invention allow a wireless service provider to offer services to consumers that do not have a monthly wireless contract by utilizing the ad-hoc capabilities of consumer devices that do have a monthly wireless contract with the wireless service provider. This not only allows a wireless service provider to expand their customer base, but also provides consumers with more options when they are seeking an internet connection. Furthermore, providing such ad-hoc services may also give a wireless service provider a competitive edge. For example, the wireless service provider might advertise that they have more "in plan-ad hoc" Wi-Fi hot spots for current subscribers or the wireless service provider may offer such services as a "loyalty" program. Implementation of embodiments of the invention may take a variety forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon, preferably computer-readable storage media.

A computer-readable storage medium may be, for example, but is not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, generally designated 100, in accordance with one embodiment of the present invention. Distributed data processing environment 100 depicts wireless service provider 102, communicatively coupled to mobile computing devices 104 and 106; and depicts mobile computing devices 104 and 106 communicatively coupled to end user computing devices 108, 110, 112, 114, and 116.

Wireless service provider 102 represents a collection of resources including computing systems and components, which are interconnected through various connections and protocols and, in one embodiment, provides wireless communication to mobile computing devices 104 and 106 via radio frequencies transmitted over a cellular network. In another embodiment, wireless service provider 102 communicates with mobile computing devices 104 and 106 via satellite communications. Mobile computing devices 104 and 106 are depicted herein as smartphones. In other embodiments, mobile computing devices 104 and 106 may be a tablet computer or any other computing device capable of connecting to wireless service provider 102 via a cellular tower or satellite dish, and capable of using short range wireless frequencies (e.g., Wi-Fi, Bluetooth™) to allow end user computing devices 108, 110, 112, 114, and 116 to use the mobile computing devices as network access points for the cellular network provided by wireless service provider 102. End user computing devices 108, 110, 112, 114, and 116 may be any device capable of short-range wireless communication, for example, a laptop or smartphone.

Network access program 118 resides on one or more resources of wireless service provider 102 and utilizes the "hotspot" capability of mobile devices in contract with wireless service provider 102 (e.g., mobile computing devices 104 and 106) to expand coverage to non-contracted users (e.g., end user computing devices 108, 110, 112, 114, and 116) within wireless range to a contracted mobile computing device. As a non-contracted user reaches the limits of wireless communication with a contracted mobile device (geographical distance, if the contracted mobile device is running out of excess bandwidth, etc.), transfer connection program 120 seamlessly transfers the connection from the contracted mobile device to a second contracted mobile device. For example, if end user computing device 110 is connected to the Internet through mobile computing device 104, but is physically moving away from mobile computing device 104 and towards mobile computing device 106, transfer connection program 120 facilitates the transfer of the connection to mobile computing device 106 such that service to end user computing device 110 is not interrupted. In one embodiment, transfer connection program 120 is a function, or subroutine, of network access program 118. In another embodiment, transfer connection program 120 may be independent of network access program 118. Exemplary implementations of network access program 118 and transfer connection program 120 are discussed with regard to FIGS. 2 and 4, respectively.

Local provider program 122 resides on a contracted mobile computing device (e.g., mobile computing device 104 and/or 106) and provides intermediate functionality to facilitate a connection between wireless service provider 102 and a non-contracted device (e.g., end user computing device 108, 110, 112, 114, or 116). As depicted, instances of local provider program 122 reside on both mobile computing device 104 and mobile computing device 106. An exemplary implementation of local provider program 122 is discussed with regard to FIG. 3.

Exemplary components of wireless service provider 102 are depicted and described in further detail with reference to FIG. 5.

Figure 2:
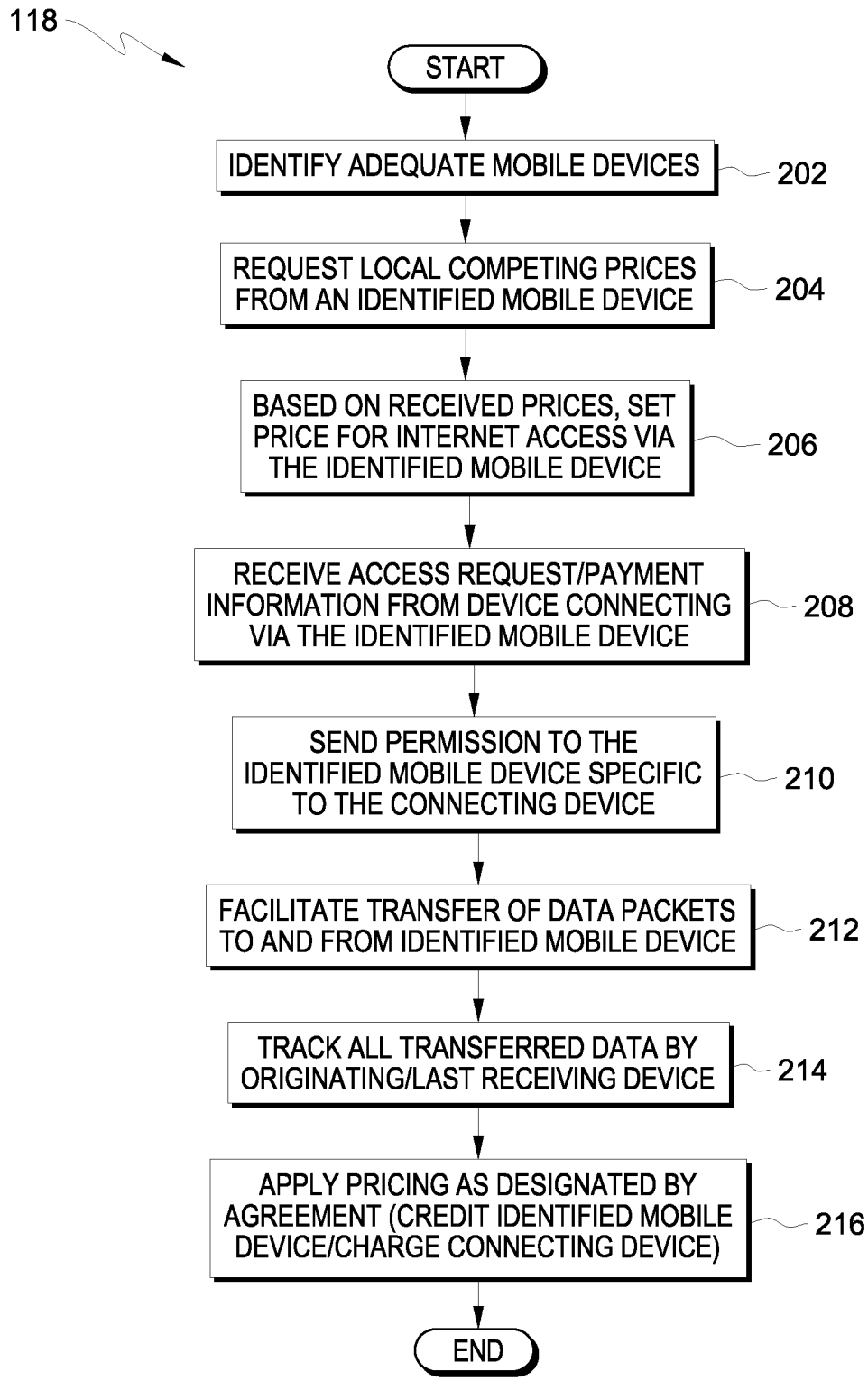
FIG. 2 is a flowchart depicting operational steps of a network access program for a wireless service provider using consumer mobile devices as network access points, in accordance with an embodiment of the present invention.

FIG. 2 is a flowchart depicting operational steps of network access program 118, in accordance with an embodiment of the present invention.

Network access program 118 identifies one or more adequate mobile devices that can be used as network access points for non-contracted computing devices (step 202). In a preferred embodiment, mobile computing devices that contractually receive service from wireless service provider 102 may also be registered to provide network access to non-contracted computing devices. The terms of such a registration may vary. For example, a mobile computing device may, in some instances, specify certain conditions that must be met for them to be available in such a capacity (e.g., within a certain geographic location, within a certain period of time, on certain days, on off peak hours, etc.) When a registered mobile computing device is accessible to wireless service provider 102, network access program 118 may query the mobile computing device to determine whether such conditions are met. In one embodiment, a mobile computing device may send a notification to wireless service provider 102 indicating that they are available for such use. The registration may also be included as a term of the service contract.

In an alternate embodiment, network access program 118 may request permission from a user of a contracted mobile device. For example, wireless service provider 102 may want to provide service to a particular area (e.g., an airport, a coffee shop at lunch time, etc.). Network access program 118 may identify mobile devices under contract that are in or near that area. Network access program 118 may query the mobile devices or check an internal database to determine the mobile devices that meet necessary specifications for providing network access. For example, the mobile device should be capable of creating a hotspot. In one embodiment, upon determining a capable and contracted mobile device, network access program 118 may query a user of the determined mobile device, via a text message for example, for permission to use the mobile device as a network access point. Network access program 118 may facilitate the offering and/or negotiation of different incentives. Network access program 118 may also offer incentives for mobile devices near a desired location to relocate to the desired location.

Subsequent to identifying one or more mobile devices that may be used by wireless service provider 102 as network access points, network access program 118 may request local competing prices from an identified mobile device (step 204). To effectively compete as a network provider at a given location, wireless service provider 102 may find it valuable to know the prices of competing providers. Computing devices capable of wireless connections already have the ability to search for local available wireless networks. Network access program 118 leverages the existing capabilities of any identified mobile devices to determine what connections are currently available in the area and at what price. For example, network access program 118 may query an identified mobile device for local prices, and receive a list of available connections and corresponding pricing. In one embodiment, the received corresponding pricing may be an html page sent to the identified mobile device from the available connection, and network access program 118 may parse the html code or perform a "screen scrape" to identify the corresponding price.

In one embodiment, network access program 118 sets a price for internet access via the identified mobile device based on received competing prices (step 206). For example, in one implementation, network access program 118 sets the price to match or beat the lowest available competing price. In another exemplary implementation, network access program 118 may set the price to match an average of the available competing prices. A person of ordinary skill in the art will understand that many formulas may be used for setting a price based on competing prices. Network access program 118 notifies the identified mobile device of the price.

Network access program 118 may receive an access request and payment information from a computing device connecting to the network provided by wireless service provider 102 via the identified mobile device (step 208). In one embodiment, a computing device attempting to connect to the Internet through the identified mobile device is provided with a limited connection. Network access program 118 may send a secure page requesting payment, such as credit card information to the connecting device. Alternatively, network access program 118 may direct the connecting device to a web page capable of accepting a payment, such as PayPal®. A person of ordinary skill in the art will recognize that payment may be an up front fee (e.g., ten dollars for half an hour), or may be a payment authorization for a subsequent payment based on various terms and conditions (e.g., authorization to pay at a rate of one dollar per megabyte, etc.). Once payment is received, or a notification of a valid payment is received from a third party web site, network access program 118 may send permission to the identified mobile device to allow full network access to the connecting device (step 210).

Once full access is granted to the connecting device, wireless service provider 102 facilitates the transfer of data packets to and from the identified mobile device in a standard fashion (step 212). During said transfer, network access program 118 tracks all transferred data by the originating/destination device (step 214). For example, network access program 118 may determine the originating and/or destination device by reading packet headers. The identified mobile device may transfer data for its own purposes or for one or more computing devices connected to the Internet through the identified mobile device. The amount of data transferred for each connected device and for the identified mobile device is stored.

Network access program 118 applies pricing to the connecting devices as designated by agreement (step 216). For example, a registration agreement of the identified mobile device might specify that the identified mobile device is credited a certain amount of data usage for allowing devices to connect to it, or a certain percentage of fees collected, or some other incentive offered by wireless service provider 102. A connecting device, on the other hand, may have agreed to pay at a certain amount per unit of data usage. Network access program 118 may apply the charge rate to the tracked amount of data that originated from and was received by the connecting device, and apply such fees. Persons of ordinary skill in the art will recognize that a multitude of different incentives, credits, and charges may be agreed to by any of the involved parties.

Figure 3:
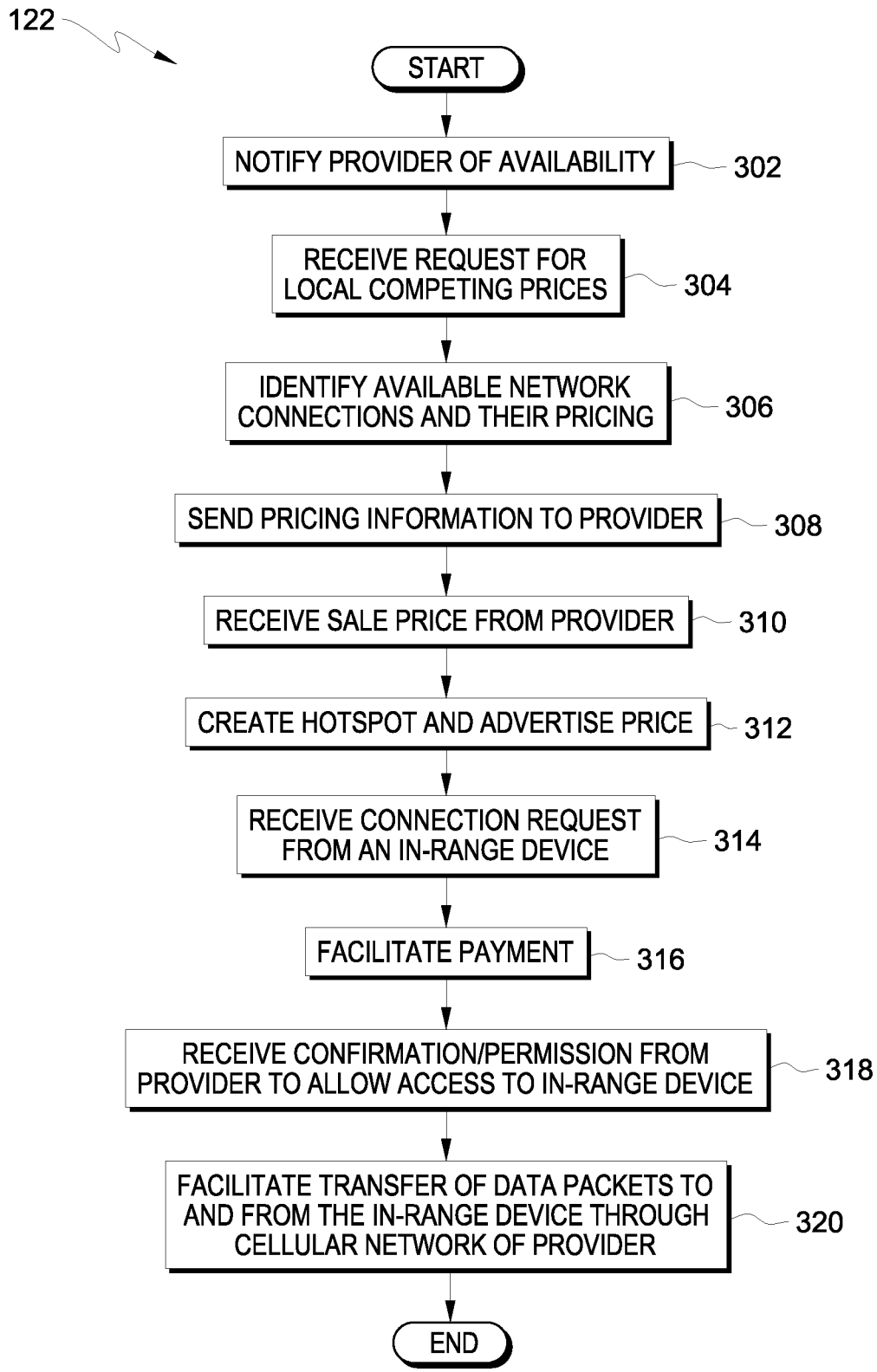
FIG. 3 is a flowchart depicting operational steps of a local provider program for facilitating a connection between a local device and a wireless service provider via a registered mobile device, in accordance with an embodiment of the present invention.

FIG. 3 is a flowchart depicting operational steps of local provider program 122 for facilitating a connection between a local device and wireless service provider 102 via a registered mobile device, in accordance with an embodiment of the present invention. The functionality of local provider program 122 may come pre-installed on a mobile device or may be downloaded and installed upon registration of the mobile device with wireless service provider 102. Local provider program 122 works in conjunction with network access program 118.

In one embodiment, local provider program 122 notifies wireless service provider 102 that the mobile device that it resides on is available for use as a network access point (step 302). Subsequently, local provider program 122 receives a request from wireless service provider 102 for local competing prices (step 304). Local provider program 122 identifies available network connections and their pricing (step 306). In one embodiment, local provider program 122 initiates a search for wireless network connections, and, upon finding a wireless network connection, attempts to connect to the wireless connection. In response, local provider program 122 may receive an html document, specifying pricing, from the wireless connection. In another embodiment, the standard Wi-Fi specification may be enhanced to include pricing and/or a flag indicating that shared Wi-Fi is available. Local provider program 122 sends the pricing information to wireless service provider 102 (step 308).

Local provider program 122 receives a price at which to offer Internet access from wireless service provider 102 (step 310). Local provider program 122 creates a hotspot and advertises the price (step 312). In one embodiment, the Wi-Fi specification is enhanced to include the price so that a computing device looking for a connection can quickly identify such terms. In another embodiment, subsequent to the creation of a hotspot, when a computing device attempts to access the network through the mobile computing device, local provider program 122 may provide or forward a web page specifying the price and other terms and conditions.

Local provider program 122 receives a connection request from an in-range device (step 314) and facilitates the payment (step 316) by providing a payment form or by directing the connecting device to a web site capable of taking and verifying a payment. In one embodiment, a payment form may be embedded in a web page sent to the in-range device specifying the price and terms and conditions. Subsequently, local provider program 122 receives confirmation and/or permission from wireless service provider 102 to allow full access to the in-range device (step 318). Local provider program 122 facilitates the transfer of data packets to and from the in-range of device to the cellular network of wireless service provider 102 (step 320). In one embodiment, local provider program 122 may also keep track of data used by connecting devices to ensure accuracy of records kept by wireless service provider 102.

Figure 4:
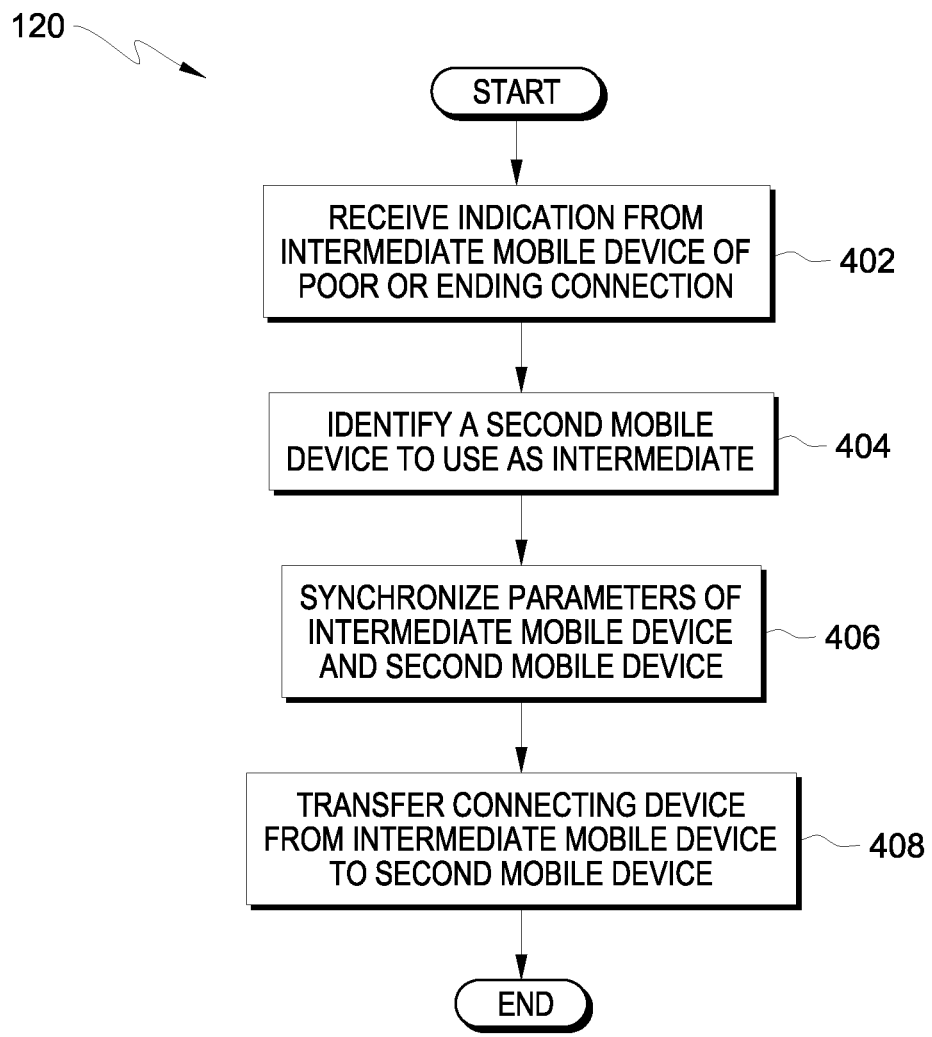
FIG. 4 illustrates operational steps of a transfer connection program for providing a seamless transfer of a computing device connecting to the cellular network of a wireless service provider from one mobile device to another, in accordance with an embodiment of the present invention.

FIG. 4 illustrates operational steps of transfer connection program 120 for providing a seamless transfer of a computing device connecting to the cellular network of wireless service provider 102 from one mobile device to another, in accordance with an embodiment of the present invention.

Transfer connection program 120, operating on at least one of the resources of wireless service provider 102, receives an indication from an intermediate mobile device (a mobile device acting as a network access point to a computing device) of a poor or ending connection (step 402). For example, a connecting computing device may be moving away from the intermediate mobile device or the intermediate mobile device may be moving away from the connecting computing device. Transfer connection program 120 may receive a notification from the intermediate mobile device of diminishing signal strength. Alternatively, an intermediate mobile device might only be scheduled to act as a network access point for a certain period of time, and the period of time may be coming to an end.

Transfer connection program 120 identifies a second mobile device to use as an intermediate mobile device (step 404). In one embodiment, transfer connection program 120 searches a list of mobile devices registered to provide such a service that are in or near the area. Depending on the terms of registration, transfer connection program 120 may automatically use the mobile device accordingly or may query the mobile device for permission. In another embodiment, transfer connection program 120 may locate mobile devices connecting through mobile service provider 102 that are not registered, and may individually query such mobile device, e.g., via a text message, for permission. Transfer connection program 120 may offer incentives for mobile devices near the location to move to the location and may offer incentives for mobile devices to stay in the location for a specified period of time.

Once a second mobile device is identified, transfer connection program 120 synchronizes parameters of the intermediate mobile device and the second mobile device (step 406). More specifically, transfer connection program 120 sets the wireless ad-hoc parameters of the second mobile device to the same parameters of the intermediate mobile device (e.g., the Service Set ID) except for the broadcast channel within the radio frequency band. In a preferred embodiment, permission to adjust parameters is given to wireless service provider 102 when the intermediate and second mobile devices register with wireless service provider 102, and when desired parameter changes are received from wireless service provider 102, the receiving mobile device changes its own parameters accordingly. Transfer connection program 120 subsequently transfers the connecting computing device from the intermediate mobile device to the second mobile device (step 408). In one embodiment, transfer connection program 120 notifies the connecting computing device to switch from the channel of the intermediate mobile device to the channel of the second mobile device. Because the rest of the parameters are the same, the connecting computing device is able to switch its connection to the second mobile device without an apparent loss of connection.

Figure 5:
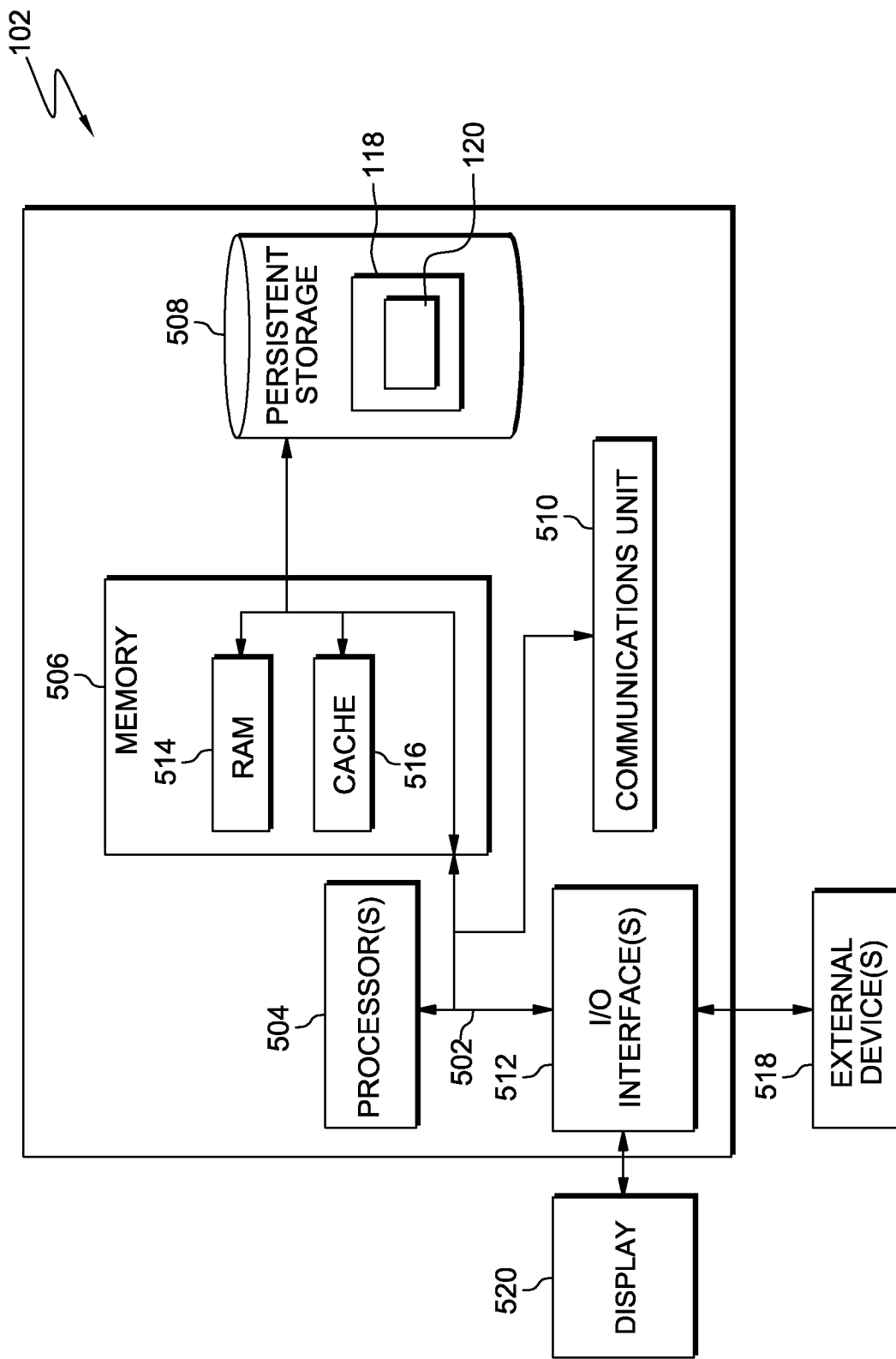
FIG. 5 depicts a block diagram of components of at least one resource of a wireless service provider, in accordance with an illustrative embodiment of the present invention.

FIG. 5 depicts a block diagram of components of at least one resource of wireless service provider 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made. For example, wireless service provider 102 may comprise such components spread through multiple systems and resources and may provide systems and resources beyond what is necessary to operate embodiments of the present invention.

Wireless service provider 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage medium.

Network access program 118 and transfer connection program 120 are stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including systems and devices within or controlled by wireless service provider 102 and mobile computing devices 104 and 106. In these examples, communications unit 510 includes one or more wireless network interface cards. Communications unit 510 may provide communications through the use of either or both physical and wireless communications links. Computer programs and processes may be downloaded to persistent storage 508 through communications unit 510.

I/O interface(s) 512 allows for input and output of data with other devices that may be connected to wireless service provider 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 512. I/O interface(s) 512 may also connect to a display 520.

Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing network access, the method comprising:
   a computer system identifying a mobile computing device capable of short-range wireless communication and in a first agreement to receive service from a cellular network;
   the computer system providing, to the mobile computing device, terms for a third party computing device to agree to in order to gain access to the cellular network via the mobile computing device, such that the mobile computing device can provide the terms to third party computing devices in wireless range of the mobile computing device;
   in response to receiving an indication from the mobile computing device that a third party computing device has agreed to the terms, thereby creating a second agreement for the third party computing device to receive service from the cellular network, the computer system indicating to the mobile computing device to allow the third party computing device to access the cellular network via the mobile computing device;
   the computer system tracking an amount of data consumed by the third party computing device via the mobile computing device and charging the third party computing device for the amount of data consumed by the third party computing device via the mobile computing device based on the agreed to terms; and
   the computer system providing an additional amount of data that may be consumed by the mobile computing device under a terms of service contract based on the tracked amount of data consumed by the third party computing device via the mobile computing device.

2. The method of claim 1, further comprising:
   the computer system requesting, from the mobile computing device, competing prices of network connections in wireless range of the mobile computing device;
   the computer system receiving at least one competing price of a network connection in wireless range of the mobile computing device from the mobile computing device; and
   the computer system setting a price for access to the cellular network based on the received at least one competing price.

3. The method of claim 1, further comprising:
   the computer system crediting a fee due by a user of the mobile computing device under terms of a service contract based on the amount charged to the third party computing device for data consumed by the third party computing device.

4. The method of claim 1, further comprising the computer system providing the mobile computing device one or more incentives to provide a network connection to the third party computing device.

5. A computer program product for providing network access, the computer program product comprising:
- one or more non-transitory computer-readable storage media and program instructions stored on the one or more non-transitory computer-readable storage media, the program instructions comprising:
- program instructions to identify a mobile computing device capable of short-range wireless communication and in a first agreement to receive service from a cellular network;
- program instructions to provide, to the mobile computing device, terms for a third party computing device to agree to in order to gain access to the cellular network via the mobile computing device, such that the mobile computing device can provide the terms to third party computing devices in wireless range of the mobile computing device;
- program instructions to, in response to receiving an indication from the mobile computing device that a third party computing device has agreed to the terms, thereby creating a second agreement for the third party computing device to receive service from the cellular network, indicate to the mobile computing device to allow the third party computing device to access the cellular network via the mobile device;
- program instructions to track an amount of data consumed by the third party computing device via the mobile computing device and charge the third party computing device for the amount of data consumed by the third party computing device via the mobile computing device based on the agreed to terms; and
- program instructions to provide an additional amount of data that may be consumed by the mobile computing device under a terms of service contract based on the tracked amount of data consumed by the third party computing device via the mobile computing device.

6. The computer program product of claim 5, further comprising program instructions, stored on the one or more computer-readable storage media, to:
- request competing prices of network connections in wireless range of the mobile computing device;
- receive at least one competing price of a network connection in wireless range of the mobile computing device from the mobile computing device; and
- set a price for access to the cellular network based on the received at least one competing price.

7. The computer program product of claim 5, further comprising:
- program instructions to credit a fee due by a user of the mobile computing device under terms of a service contract based on of the amount charged to the third party computing device for data consumed by the third party computing device.

8. A system for providing network access, the system comprising:
- one or more computer processors;
- one or more non-transitory computer-readable storage media;
- program instructions stored on at least one of the one or more non-transitory computer-readable storage media for execution by at least one of the one or more computer processors, the program instructions comprising:
- program instructions to identify a mobile computing device capable of short-range wireless communication and in a first agreement to receive service from a cellular network;
- program instructions to provide, to the mobile computing device, terms for a third party computing device to agree to in order to gain access to the cellular network via the mobile computing device, such that the mobile computing device can provide the terms to third party computing devices in wireless range of the mobile computing device;
- program instructions to, in response to receiving an indication from the mobile computing device that a third party computing device has agreed to the terms, thereby creating a second agreement for the third party computing device to receive service from the cellular network, indicate to the mobile computing device to allow the third party computing device to access the cellular network via the mobile device;
- program instructions to track an amount of data consumed by the third party computing device via the mobile computing device and charge the third party computing device for the amount of data consumed by the third party computing device via the mobile computing device based on the agreed to terms; and
- program instructions to provide an additional amount of data that may be consumed by the mobile computing device under a terms of service contract based on the tracked amount of data consumed by the third party computing device via the mobile computing device.

9. The system of claim 8, further comprising program instructions, stored on at least one of the one or more computer-readable storage media for execution by at least one of the one or more computer processors, to:
- request competing prices of network connections in wireless range of the mobile computing device;
- receive at least one competing price of a network connection in wireless range of the mobile computing device from the mobile computing device; and
- set a price for access to the cellular network based on the received at least one competing price.

10. The system of claim 8, further comprising:
- program instructions to credit a fee due by a user of the mobile computing device under terms of a service contract based on of the amount charged to the third party computing device for data consumed by the third party computing device.

* * * * *